(12) United States Patent
Neil

(10) Patent No.: US 8,972,977 B2
(45) Date of Patent: Mar. 3, 2015

(54) SYSTEMS AND METHODS FOR PROVIDING SEAMLESS SOFTWARE COMPATIBILITY USING VIRTUAL MACHINES

(75) Inventor: Mike Neil, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1995 days.

(21) Appl. No.: 10/883,491

(22) Filed: Jun. 30, 2004

(65) Prior Publication Data
US 2006/0010433 A1    Jan. 12, 2006

(51) Int. Cl.
*G06F 9/455* (2006.01)

(52) U.S. Cl.
CPC ........ *G06F 9/45533* (2013.01); *G06F 9/45537* (2013.01)
USPC ............................................................. 718/1

(58) Field of Classification Search
USPC ............................................................. 718/1
See application file for complete search history.

(56) References Cited

U.S. PATENT DOCUMENTS

| | | | | |
|---|---|---|---|---|
| 4,660,144 A | * | 4/1987 | Walsh ................................ | 718/1 |
| 5,361,361 A | * | 11/1994 | Hickman et al. .............. | 715/705 |
| 5,504,922 A | | 4/1996 | Seki et al. ........................ | 703/25 |
| 6,496,847 B1 | * | 12/2002 | Bugnion et al. ................... | 718/1 |
| 6,513,158 B1 | * | 1/2003 | Yogaratnam ................... | 717/166 |
| 6,637,021 B1 | | 10/2003 | Dubey ........................... | 717/108 |
| 6,646,658 B1 | * | 11/2003 | Chrisop et al. ................ | 715/749 |
| 6,675,371 B1 | * | 1/2004 | York et al. ..................... | 717/114 |
| 2002/0087476 A1 | * | 7/2002 | Salas et al. ...................... | 705/59 |
| 2004/0088377 A1 | * | 5/2004 | Henriquez .................... | 709/219 |
| 2004/0145605 A1 | * | 7/2004 | Basu et al. ..................... | 345/740 |
| 2004/0255289 A1 | * | 12/2004 | Alex George et al. ........ | 717/174 |
| 2005/0060704 A1 | * | 3/2005 | Bulson et al. ..................... | 718/1 |

OTHER PUBLICATIONS

Rick Lehrbaum, "MS Office Arrives on the Linux Desktop", Mar. 27, 2002.*
Dinda et al., A Case For Grid Computing On Virtual Machines, May 2003.*

* cited by examiner

*Primary Examiner* — Mengyao Zhe
(74) *Attorney, Agent, or Firm* — John Jardin; Kate Drakos; Micky Minhas

(57) ABSTRACT

Certain embodiments of the present invention are directed to a system for and method of providing seamless software compatibility by using virtual machines to provide an improved, more seamless method of user interaction with one or more virtual machines (VMs) that are resident on a host computer system. Several embodiments of the present invention provide a means in the host environment for directly invoking one or more guest operating system (OS) applications or files and displaying them in the host environment, rather than in a separate VM window. Furthermore, each embodiment of the present invention allows the possibility of multiple applications on multiple OSs (i.e., legacy or modern OSs), respectively, to run simultaneously and with the appearance of running seamlessly in the host environment.

20 Claims, 12 Drawing Sheets

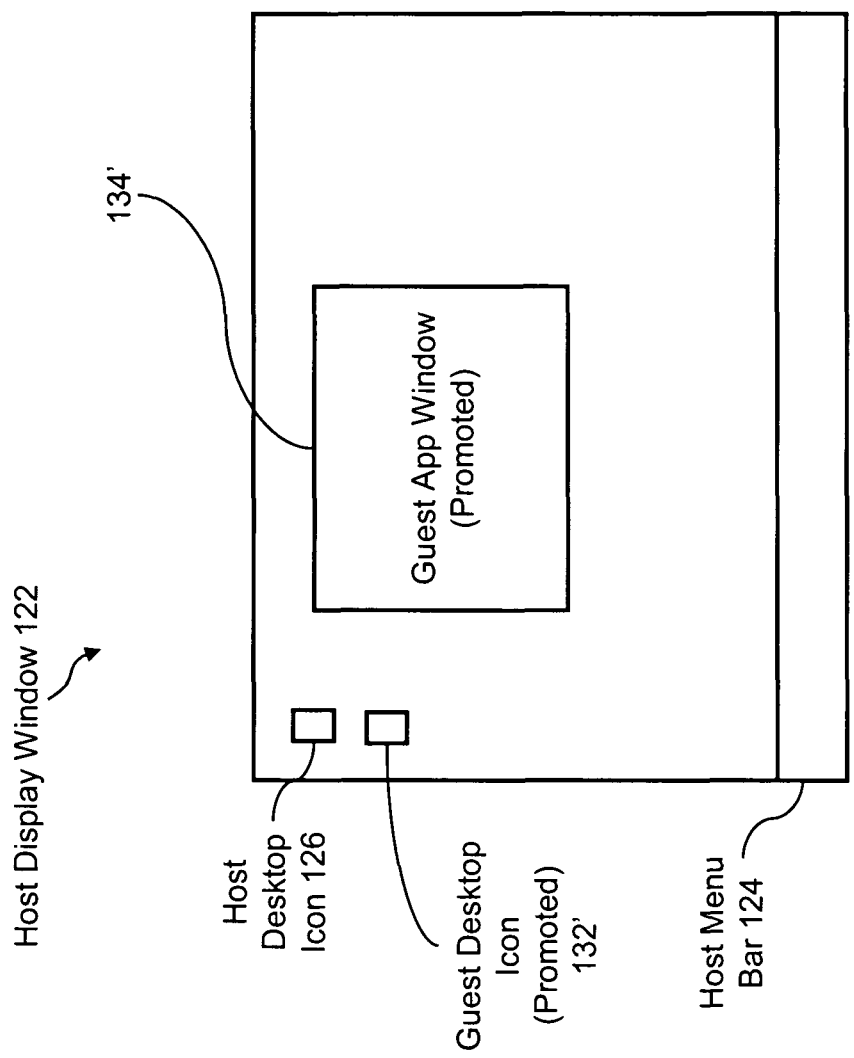

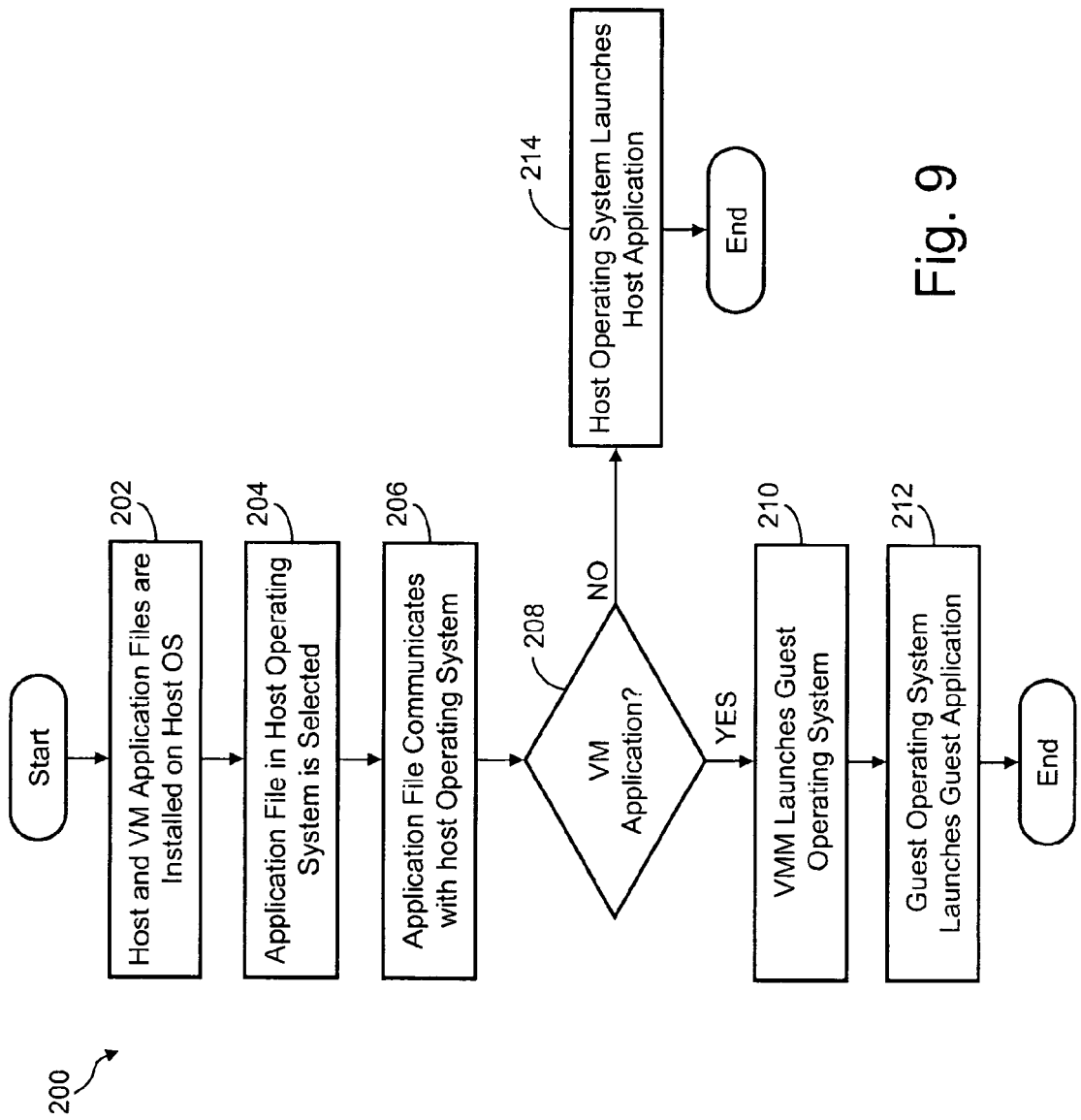

SYSTEMS AND METHODS FOR PROVIDING SEAMLESS SOFTWARE COMPATIBILITY USING VIRTUAL MACHINES

CROSS-REFERENCE

This application is related by subject matter to the inventions disclosed in the following commonly assigned application: U.S. patent application Ser. No. 10/882,829, filed on even date herewith, entitled "SYSTEMS AND METHODS FOR INTEGRATING APPLICATION WINDOWS IN A VIRTUAL MACHINE ENVIRONMENT," the entirety of which is hereby incorporated by reference herein.

FIELD OF THE INVENTION

The present invention generally relates to the field virtual machines (also known as "processor virtualization") and software that executes in a virtual machine environment. More specifically, the present invention is directed to providing seamless execution of a software application written for a first operating system on a second operating system using a using virtual machine.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters (or capabilities).

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulator program may be a host operating system (OS), which is an operating system running directly on the physical computer hardware. Alternately, the emulated environment might also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

Typically, within the host computer system which is emulating one or more VMs, there is no direct mechanism in the host environment, such as an icon on the desktop, to launch or in some way interact with applications that are running on any given VM. Rather, a VM is presented to the user on the host computer system in a separate window that displays the desktop of the guest OS in its native environment, whether it is a legacy or modern OS. Consequently, the user sees a completely separate desktop (e.g., with a separate task bar, "My Computer," Start Menu, etc.) from that of the host computer system. Using this separate VM window, the user may navigate within the guest OS to launch any VM application which, when launched, is likewise displayed in the same VM window. If the host computer system is hosting multiple VMs, the desktop of each VM will appear in its own separate window. As a result, in order for the user to interact with each VM, the user must navigate from one VM window to the next. It is cumbersome for the user to navigate from the host desktop to one or more separate VM desktops to invoke host or VM applications simultaneously, as the user must continuously swap between one window and another and must keep track of what application is running in which window. What is needed is a direct mechanism in the host environment for invoking one or more guest OS applications and displaying them in the host environment alongside and interspersed with the host computer system's applications, rather than in a separate VM window, and thereby provide the user with an improved, more seamless method of interacting with one or more VMs resident on a host computer system.

SUMMARY OF THE INVENTION

Certain embodiments of the present invention are directed to a system for and method of providing seamless software compatibility by using virtual machines to provide an improved, more seamless method of user interaction with one or more VMs that are resident on a host computer system. Several embodiments of the present invention provide a means in the host environment for directly invoking one or more guest OS applications and displaying them in the host environment, rather than in a separate VM window. Consequently, the guest operating system desktop is no longer visible. Instead, the individual guest applications windows appear alongside and interspersed with the host computer system's windows and, potentially, windows from other virtual machines that are running simultaneously, and all of the guest operating system functionality is integrated directly into the host operating system desktop (e.g., desktop icons and menu items in the Start Menu for launching applications from the desktop, etc.).

A first embodiment of the invention comprises a plurality of application proxies that are visible to the user in the host environment and an application launch layer resident in the host OS. Each application proxy is associated with a host or VM application. The function of the application launch layer is to identify whether the given application proxy is launching a host or VM application. The application launch layer then communicates to either the host OS or the VMM, respectively, to take the necessary action to launch the user-selected application. In the case of a VM application, the application launch layer communicates to the VMM to launch a VM with its associated guest OS, which subsequently launches the VM application.

In an alternative embodiment, the invention comprises a plurality of application files that are visible to the user in the host environment alongside and interspersed with the host files via a file integration layer resident in the host OS. Each application file is associated with a host or VM application. The function of the file integration layer is to allow the user to directly interact with either a host or VM application, for example, to launch the user-selected application.

Furthermore, each embodiment of the present invention allows the possibility of multiple applications on multiple OSes (i.e., legacy or modern OSes), respectively, to run simultaneously and with the appearance of running seamlessly in the host environment.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4B illustrates a host display window visually presenting a guest desktop icon and guest application window to a user within the host display window as if guest application window is part of the native OS environment;

FIG. 9 is a flowchart that illustrates a method of providing and using an integrated file system for interacting with a VM application in a host environment.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
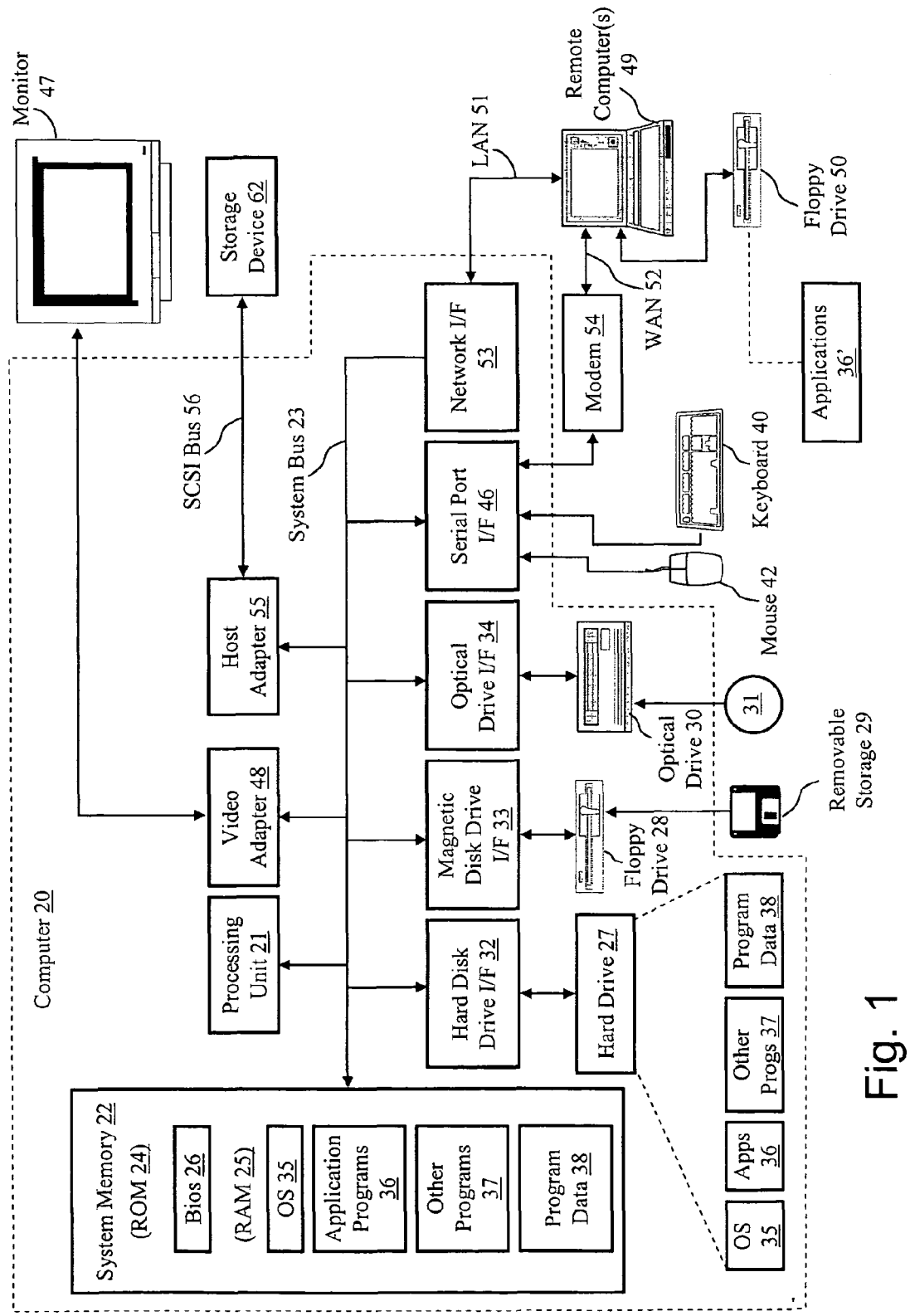
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines (VMs)

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
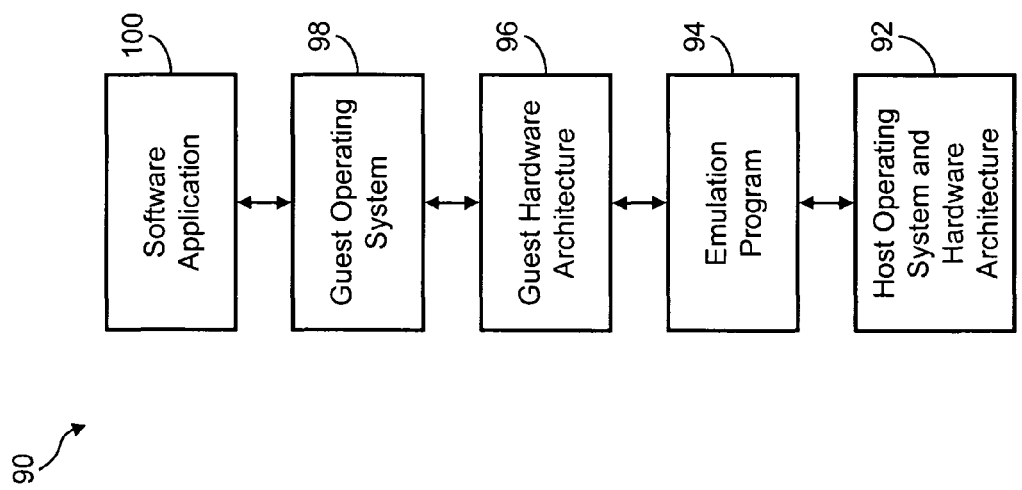
FIG. 2 illustrates the logical layering of the hardware and software architecture for an emulated operating environment in a computer system.

FIG. 2 is a diagram representing the logical layering of the hardware and software architecture for an emulated operating environment in a computer system. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

Figure 3A:
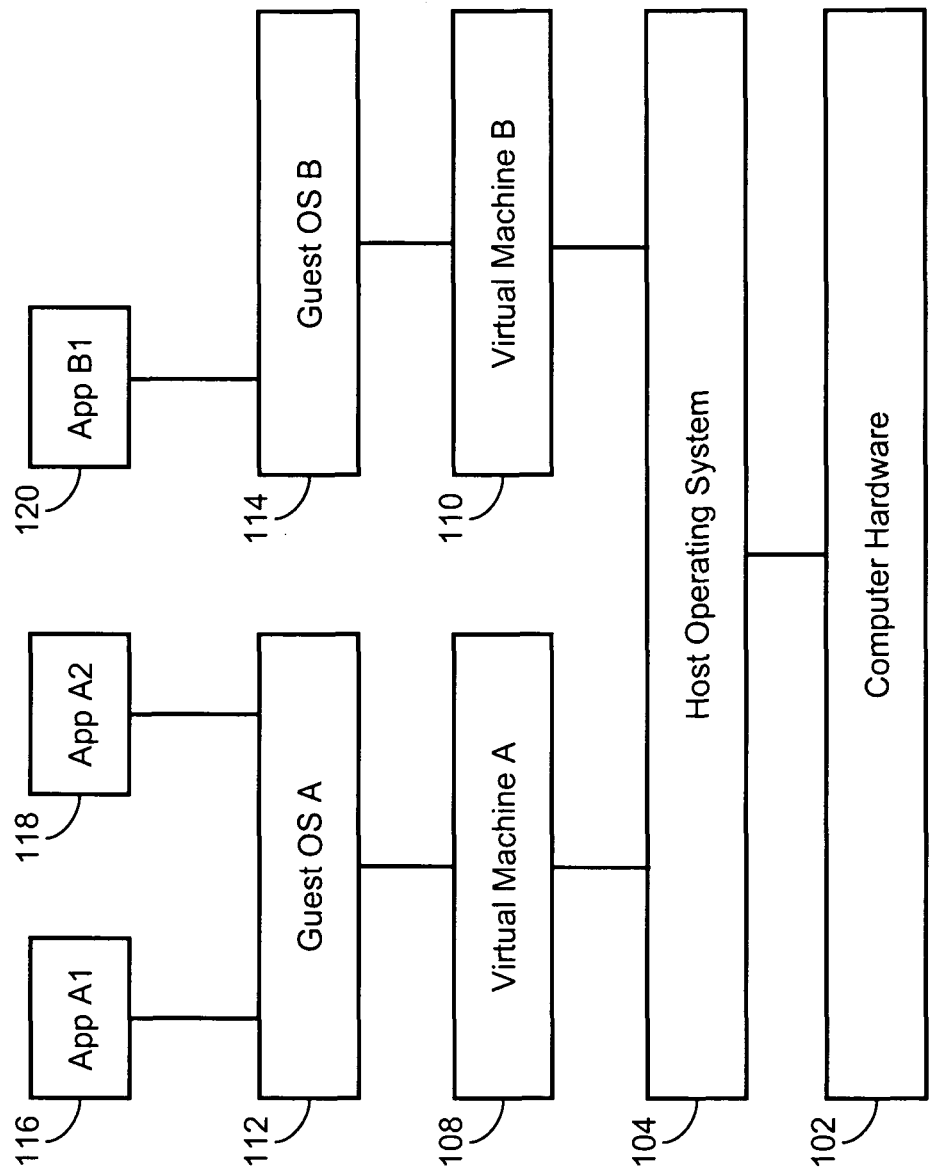
FIG. 3A illustrates a virtualized computing system.

FIG. 3A illustrates a virtualized computing system comprising a host operating system software layer 104 running directly above physical computer hardware 102, and the host operating system (host OS) 104 virtualizes all the resources of the machine by exposing interfaces that are the same as the hardware the host OS is virtualizing (which enables the host OS to go unnoticed by operating system layers running above it).

Figure 3B:
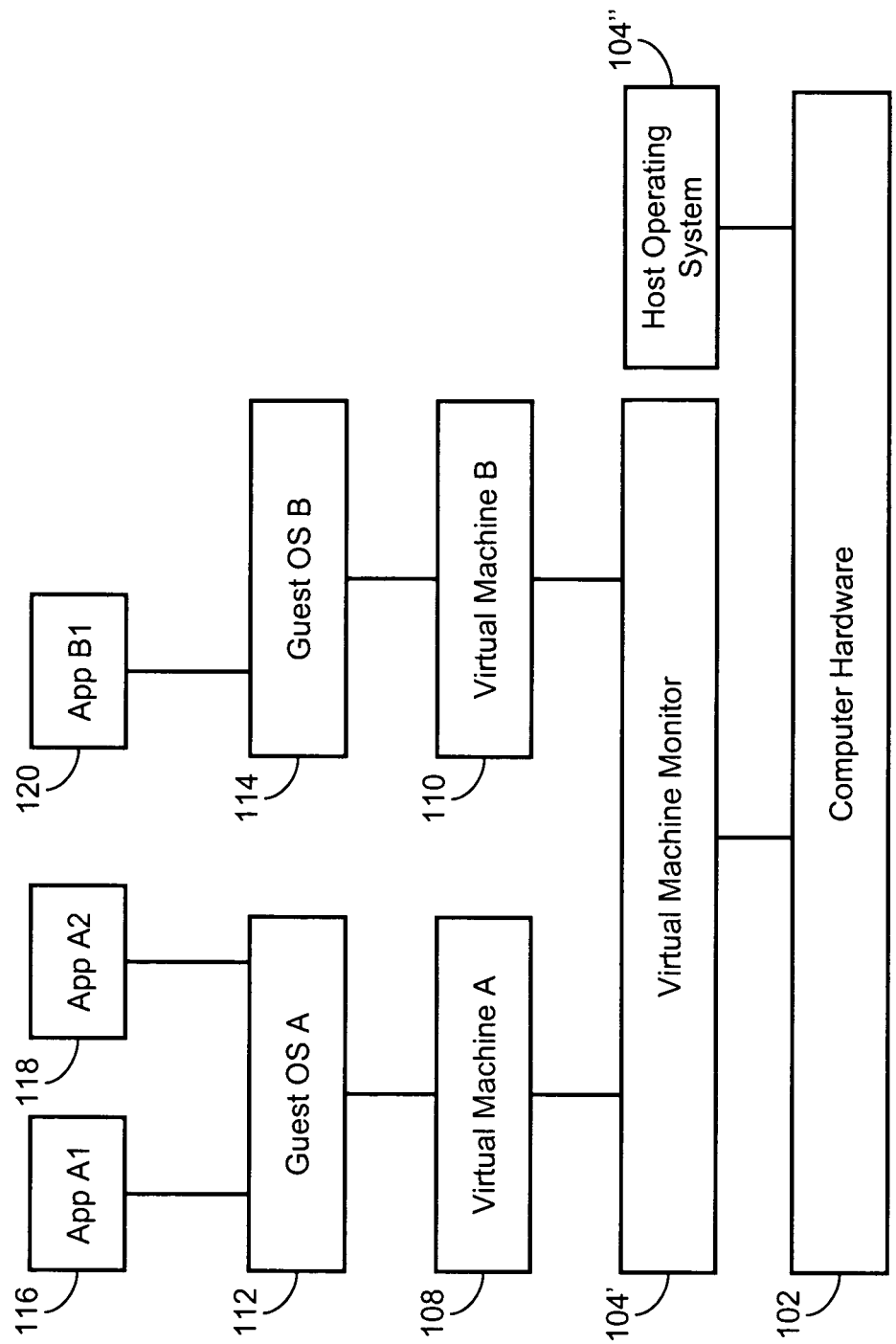
FIG. 3B illustrates an alternative embodiment of a virtualized computing system comprising a virtual machine monitor running alongside a host operating system.

Alternately, a virtual machine monitor, or VMM, software layer 104' may be running in place of or alongside a host operating system 104", the latter option being illustrated in FIG. 3B. For simplicity, all discussion hereinafter (specifically regarding the host operating system 104) shall be directed to the embodiment illustrated in FIG. 3A; however, every aspect of such discussion shall equally apply to the embodiment of FIG. 3B wherein the VMM 104' of FIG. 3B essentially replaces, on a functional level, the role of the host operating system 104 of FIG. 3A described herein below.

Referring again to FIG. 3A, above the host OS 104 (or VMM 104') are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSs) A 112 and B 114 respectively. Above guest OS A 112 are running two applications, application A1 116 and application A2 118, and above guest OS B 114 is Application B1 120.

Host OS and VM Application Integration

Figure 4A:
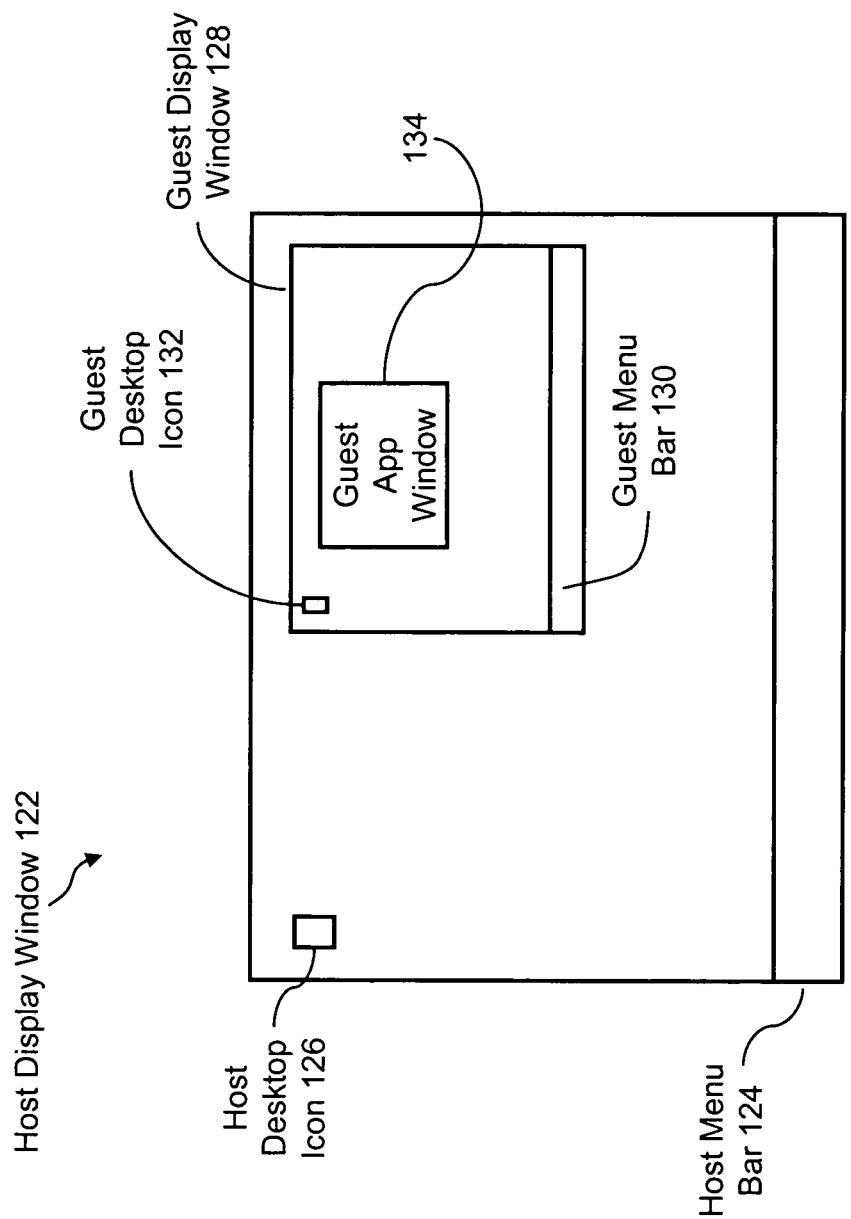
FIG. 4A illustrates a host display window showing a conventional way of visually presenting a guest application window to a user as a separate window within host display window.

FIG. 4A illustrates a host display window 122 of host OS 104" showing a conventional way of visually presenting a guest application window to a user as a separate window within host display window 122. More specifically, host display window 122 of host OS 104" displays an example host menu bar 124 by which the user may select, for example, the "Start" menu; an example host desktop icon 126 by which the user my open, for example, the "My Computer" window; a guest display window 128, which represents the visual display of, for example, guest OS A 112 of VM A 108. Guest display window 128 of guest OS A 112 of VM A 108 further displays an example guest menu bar 130 by which the user may select, for example, the "Start" menu of guest OS A 112; an example guest desktop icon 132 by which the user my open, for example, the "My Computer" window of guest OS A 112; and a guest application window 134, which is representative of the application launched via guest desktop icon 132.

Accordingly, to access VM applications, the user must be aware that a VM exists on the host OS, and the user must manually accesses the VM and its associated programs and applications via the separate VM display window, such as illustrated in FIG. 4A.

In contrast, and as illustrated in FIG. 4B, several embodiments of the present invention are directed to a host OS presenting in the host display window 122 a "promoted" guest desktop icon 132' (promoted up from the guest display window 128) to enable a user to directly execute the corresponding guest application program in the VM from the host desktop.

For certain embodiments, this promoted guest desktop icon 132' is fully integrated in with the arrangement of existing host desktop icons (e.g., host desktop icon 126), as shown in FIG. 4B; for certain alternative embodiments, the promoted guest desktop icon 132' could also be displayed in a different manner, such as by grouping all of the "promoted" icons and appending them the end of the regular icon display, or perhaps by displaying them on the right side of the host display window 122 away and apart from the host desktop icons 126.

In addition, several embodiments of the present invention are also directed to "promoting" the guest application window 134' into the host display window 122 as if guest application was executing in the native OS of host computer. For certain embodiments, this promoted guest application window 134' has the same relative size and same relative position in the host display window 122 as the guest application window 134 would have had in a guest display window 128, as illustrated in FIG. 4B; for certain alternative embodiments, the promoted guest application window 134' may have a different relative size and/or a different relative position in the host display window 122 as the guest application window 134 would have had in a guest display window 128. Of course, certain alternative embodiments of the present invention will incorporate features pertaining to both a promoted guest desktop icon 132' and a promoted guest application window 134' as illustrated in FIG. 4B is taken as a single instance of one such embodiment.

Figure 4C:
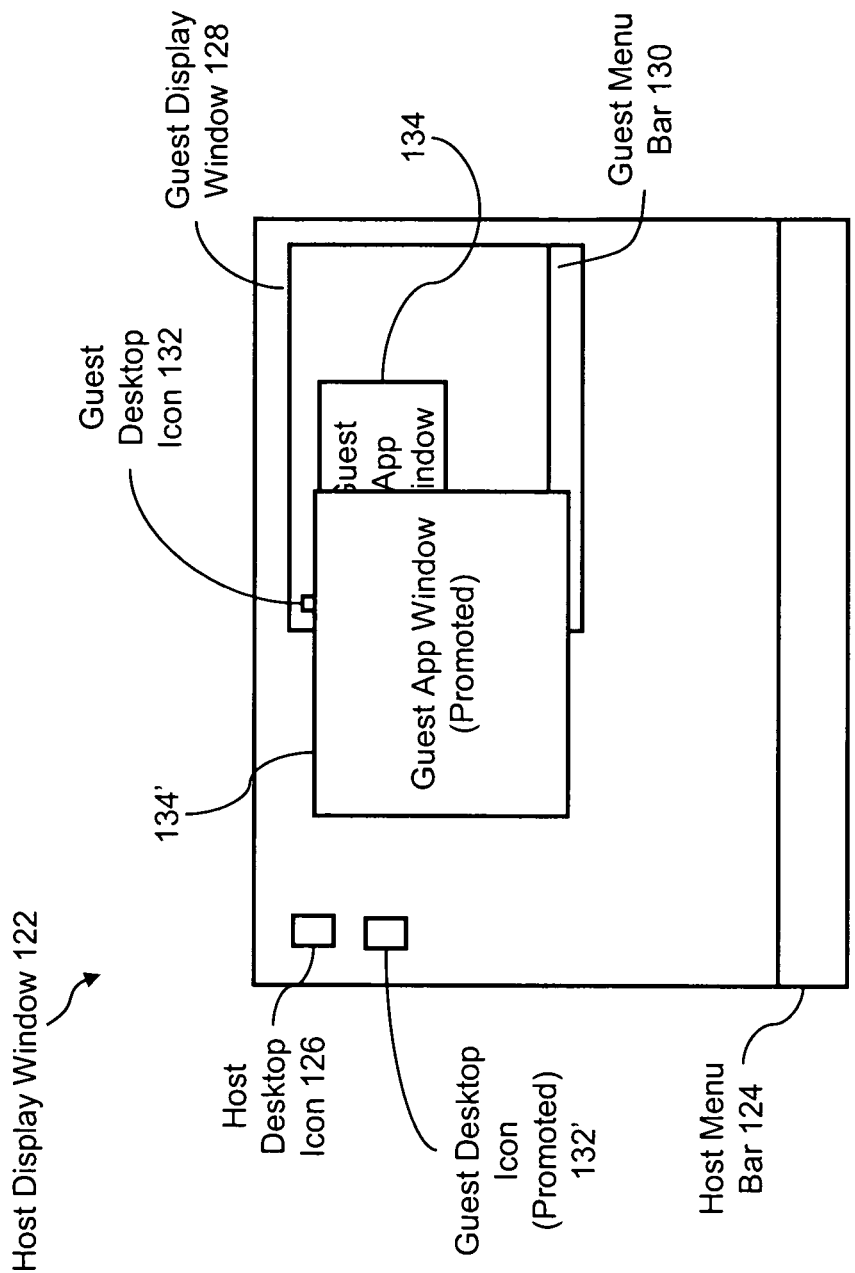
FIG. 4C illustrates a host display window visually presenting a guest desktop icon and guest application window to a user within the host display window as if guest application window is part of the native OS environment, as well as (at the user's option) the host display window also displaying a window for the guest operating system and its active components.

Moreover, for certain alternative embodiments of the present invention, as illustrated in FIG. 4C, where such seamless integration is desirable but where it may not be desirable for the end-user to be entirely unaware of the underlying VM (such as, for example, when the end-user prefers to see a guest display window whenever the VM and guest operating system are executing), the guest display window 128 and its corresponding components (the guest menu bar 130, the guest desktop icon 132, and the guest application window 134) are displayed along with the promoted guest desktop icon 132' and/or the promoted guest application window 134' as illustrated (where the promoted guest application window 134' is shown as being on top of the guest display window in this instance). Where the position of the promoted guest application window 134' in the host display window 122 is related to the position of the guest application window 134 in the guest display window 128, the movement of the promoted guest application window 134' in the host display window 122 results in a corresponding movement of the guest application window 134 in the guest display window 128 for certain embodiments, and vice versa for certain alternative embodiments, and both for certain alternative embodiments.

Figure 5:
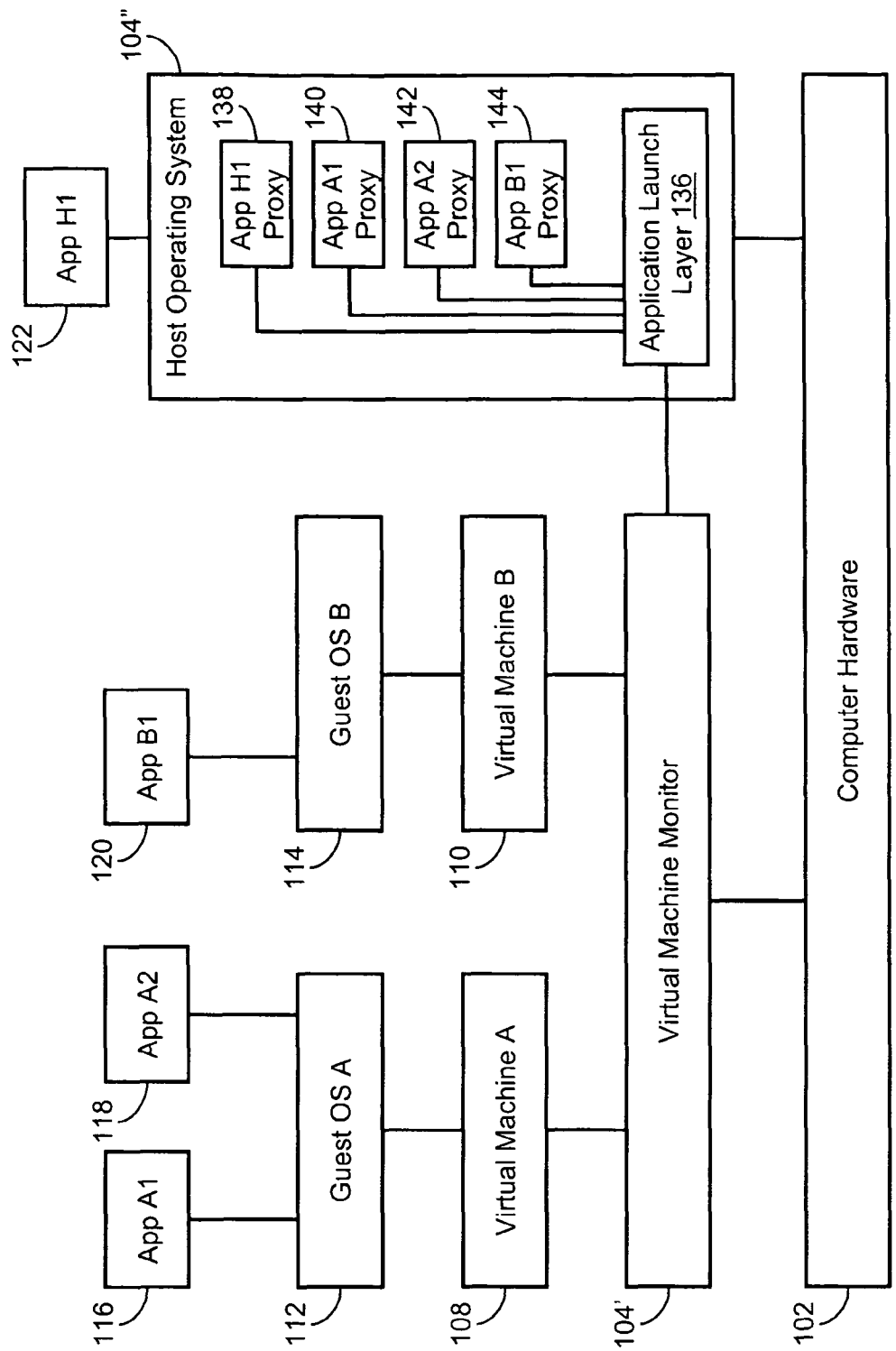
FIG. 5 is a block diagram that represents portions of the system of FIG. 3B in a first embodiment of the invention and further comprises a plurality of application proxies and an application launch layer.
Figure 6:
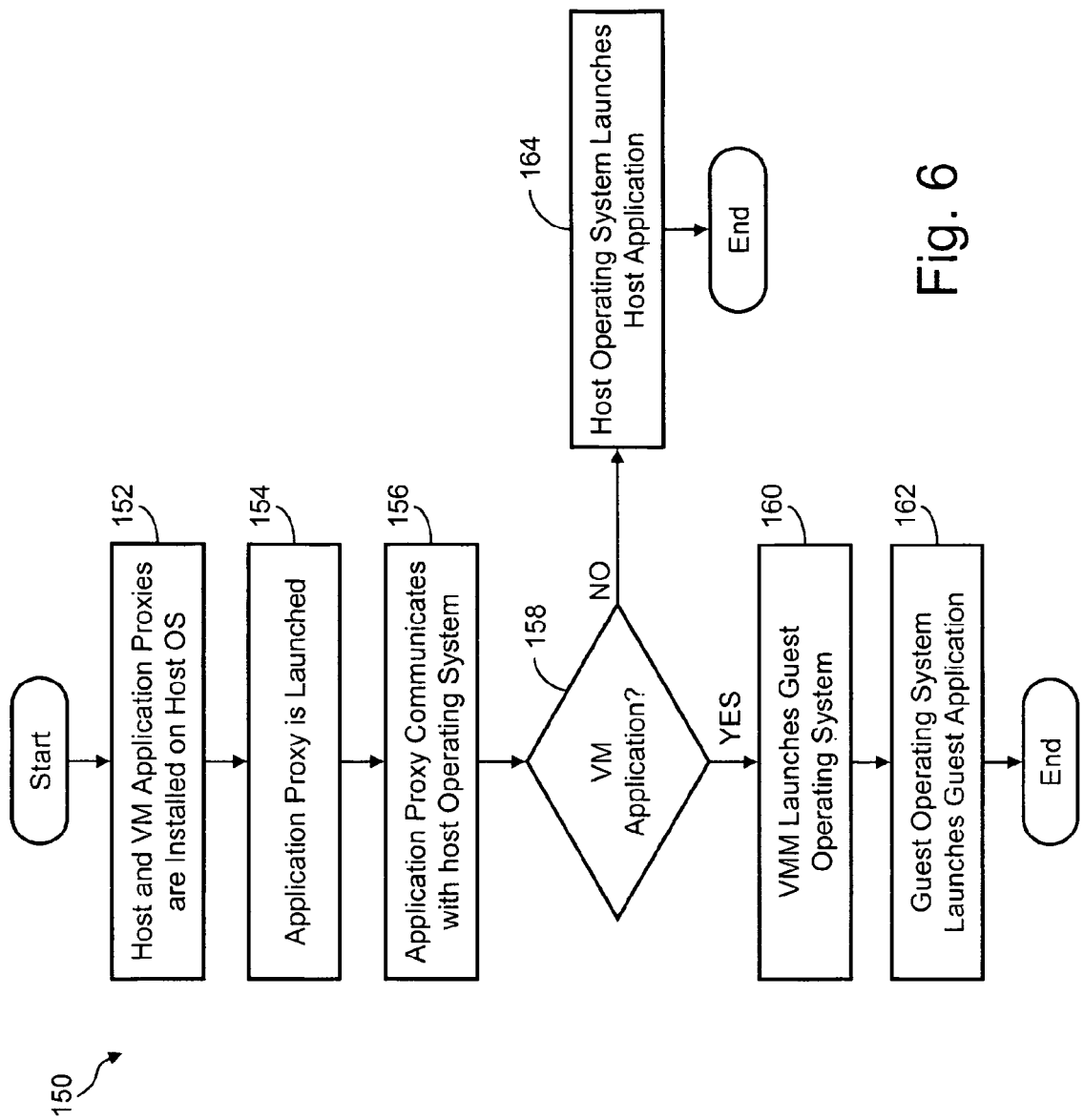
FIG. 6 is a flowchart that illustrates a method of providing and using an application proxy for launching a VM application in a host environment.

However, directing our attention once again to the embodiments of FIG. 4B where the integration is fully seamless and the end-user is essentially unaware of the virtual machine being utilized to execute the program corresponding to promoted guest desktop icon 132' (as such is visually indistinguishable from any other host desktop icon 126), for these various embodiments an automated component, illustrated in FIGS. 5 and 6, is provided specifically to ensure that an end-user need not be made aware that VM exists. In this way, a user may launch a legacy application running on a VM and the visual presentation of that application is provided to the user in the native OS environment. For example, guest desktop icon 132 is an icon for Word 97, which is a Windows 95 application. The user double-clicks on guest desktop icon 132 to launch Word 97. Subsequently, the automated component (as describe in FIGS. 5 and 6) takes over without the user's awareness to perform the following general steps:

1. The user selects the Word 97 icon on the host desktop;
2. Host OS 104" detects that Word 97, which executes in Windows 95, has been selected;
3. Host OS 104" determines that the native OS is, for example, Windows XP;
4. Host OS 104" loads Windows 95 in a VM without any display thereof;
5. Host OS 104" loads Word 97 in the Windows 95-VM; and
6. Host OS 104" promotes the display for the Word 97 application from the Windows 95-VM environment to the native OS environment of host OS 104" and seamlessly displays Word 97 to the user accordingly.

In accordance with a first embodiment of the invention, FIG. 5 illustrates host OS 104" of the system of FIG. 3B that further comprises an application H1 135, an application launch layer 136 and a plurality of application proxies that provide an automated mechanism for launching any host or VM application seamlessly in the host environment. In this example, host OS 104" comprises an application H1 proxy 138 for launching application H1 135 of host OS 104", an application A1 proxy 140 for launching application A1 116 of guest OS A 112, an application A2 proxy 142 for launching application A2 118 of guest OS A 112, and an application B1 proxy 144 for launching application B1 120 of guest OS B 114. As known and understood by those skilled in the art, a proxy is a software mechanism which passes a request from one computer entity to another, in this case, from the host OS to the VM.

Application H1 proxy 138, application A1 proxy 140, application A2 proxy 142, and application B1 proxy 144 are instantiated, for example, as icons on the desktop or the startup menu of host OS 104", and thereby provide to the user a mechanism for launching any application in the host environment, regardless of whether the application exists on the host OS or a guest OS. In this way, the use of host and VM application proxies within host OS 104" eliminates the need for the user to open and navigate separate windows in the host environment that represent the desktop of each VM by which he/she launches any associated guest OS applications. When an application proxy is selected by the user, the application launch layer 136 provides the mechanism for identifying whether the given application proxy is launching a host or VM application. Application launch layer 136 then communicates either to host OS 104" or to VMM 104', respectively, to take the necessary action to launch the user-selected application.

As a result, the user is provided a user-friendly, automated, seamless mechanism between, for example, host OS 104" and guest OS A 112 and guest OS B 114, which thus provides the visual appearance of all guest OS applications that exist and execute in the host environment. Application A1 116, application A2 118, and application B1 120 may be either legacy or modern applications; thus, this embodiment of the present invention provides a method of visually integrating an application of a legacy OS (e.g., MS-DOS™, Windows 3.X™, Windows 95™, Windows 98™, Windows Me™, Windows NT™, and Windows 2000™) within a host environment, such as Windows XP™. Furthermore, this embodiment of the present invention allows the possibility of multiple applications on multiple OSes, respectively, to run simultaneously and with the appearance of running in the host environment.

The operation of the system of FIG. 5 is described in reference to FIG. 6, which is a flowchart that illustrates a method 150 of providing and using an application proxy in a host environment for launching a VM application and visually displaying it in the native host environment. At step 152, the method first comprises the installation of an application proxy for each existing host and VM application. As a result, an icon on the desktop or startup menu of host OS 104" is provided to the user as a visual representation in the host environment of each host or VM application. Consequently, the virtual machine's desktop is no longer visible. The VM application proxies appear alongside and interspersed with the host computer system's application proxies. Furthermore, the individual VM application proxies appear alongside and interspersed with, potentially, application proxies from other VMs that are running simultaneously.

At step 154, the user selects a host or VM application to run by clicking on its associated application icon. For example, to launch application H1 135 of host OS 104", the user clicks on the application H1 proxy 138 icon. Similarly, to launch application A1 116 of guest OS A 112, the user clicks on the application A1 proxy 140 icon.

At step 156, the selected application proxy communicates a request to initiate its associated application to application launch layer 136 of host OS 104", which subsequently determines (at step 158) whether the application is a host or VM application. At step 160, if at step 158 it is determined that the request is a VM application, application launch layer 136 communicates to VMM 104' to launch a VM with its associated guest OS, such as VM A 108 and guest OS A 112 or VM B 110 and guest OS B 114. At step 162, the guest OS launches the VM application, such as guest OS A 112 launching application A1 116 or guest OS B 114 launching application B1 120. The application subsequently executes and is presented visually to the user as though the application were running in the host environment, even though it is actually executing on a VM. At step 164, if at step 158 it is determined that the request is a host application, such as application H1 proxy 138 requesting to launch application H1 135, application launch layer 136 communicates to host OS 104" to launch the host application.

Host OS and VM File Integration

In addition to visually integrating applications running in a guest operating system on a virtual machine into the host operating system display environment, a similar approach to integration would also be advantageous in regard to files and other data structures that exist in the virtual machine, e.g., files that exist on a virtual hard drive (VHD) for a given virtual machine (VM). As known and appreciated by those of skill in the art, the files of a VHD are logical constructs that are typically stored as a single file (or, in some cases, as a series of interrelated files that together comprise the VHD) in some sort of persistent data store (i.e., the hard drive of the host computer), which is discussed more fully herein below. Consequently, while these individual data files stored in the VHD are accessible to the VM, they are not directly accessible to the host operating system (although the single file on the physical hard drive that corresponds to the entire VHD volume may be accessible) but must be accessed through the VM. Similarly, the VM, which provides an environment to a guest OS such that the guest OS is largely unaware that it is executing on a VM and not on physical hardware, is unaware of the files that exist for the host operating system, and thus executing a VM application to, say, edit a host operating system file, is somewhat problematic in the existing art. Therefore, on the one hand it would be advantageous if files on a VHD were seamlessly displayed and accessible to the user through the host operating system, and it would also be advantageous if the files on the host operating system were seamlessly accessible to applications executing in the virtual machine. Several embodiments of the present invention are directed to provided such solutions.

Figure 7B:
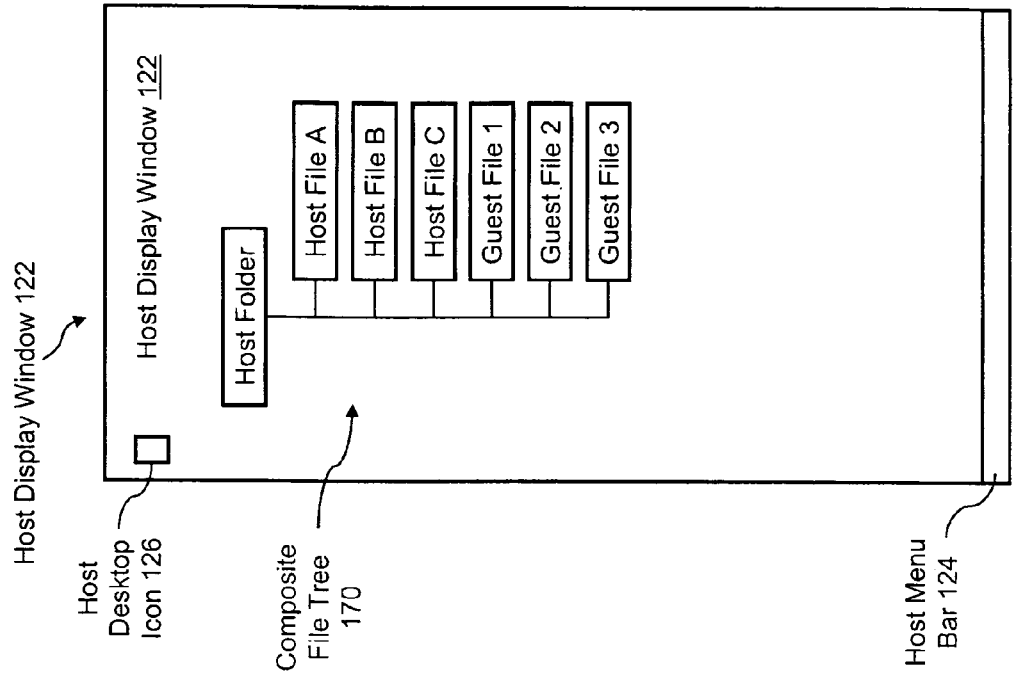
FIG. 7B illustrates host display window visually presenting a composite file tree, which is the combination of a host file tree and a guest file tree, to a user within host display window as if guest file tree is part of the native OS environment.
Figure 7A:
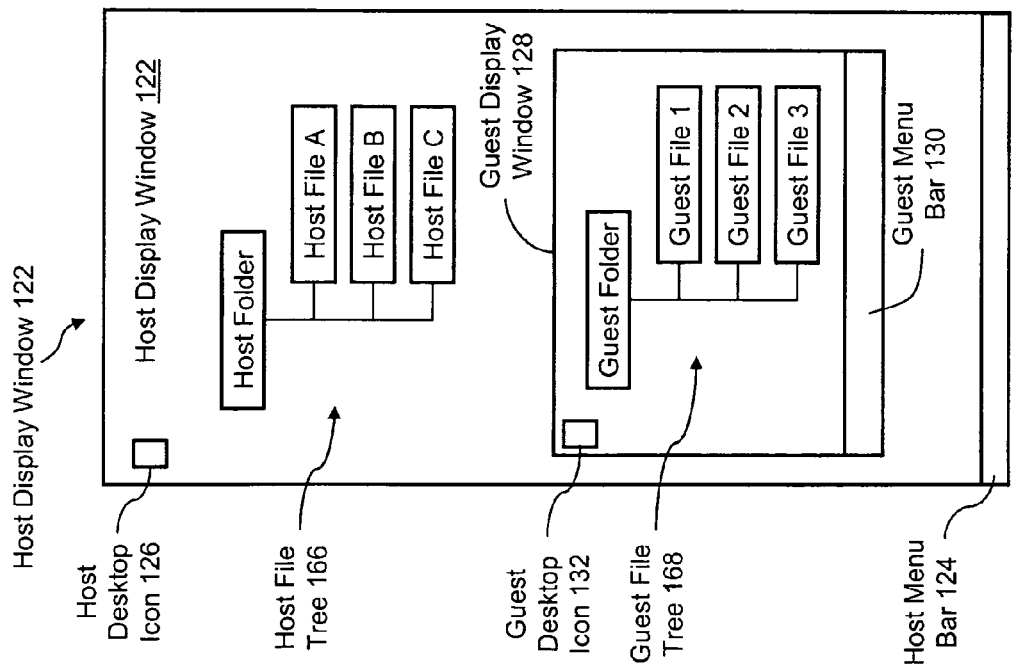
FIG. 7A illustrates host display window showing a conventional way of visually presenting a guest file tree to a user in a separate window within host display window.

FIG. 7A illustrates host display window 122 of host OS 104" showing a conventional way of visually presenting a guest file tree to a user in a separate window within host display window 122. More specifically, host display window 122 of host OS 104" displays the example host menu bar 124 by which the user may select, for example, the "Start" menu; the example host desktop icon 126 by which the user my open, for example, the "My Computer" window; an example host file tree 166 that may be displayed within the host "My Computer" window (not shown); and guest display window 128, which represents the visual display of, for example, guest OS A 112 of VM A 108. Host file tree 166 further includes, for example, a host folder containing various host application files, such as a host file A, B, and C.

Guest display window 128 of guest OS A 112 of VM A 108 further displays an example guest file tree 168 that may be displayed within the guest "My Computer" window (not shown) of guest display window 128. Guest file tree 168 further includes, for example, a guest folder containing various guest application files, such as a guest files 1, 2, and 3. Accordingly, the user must be aware that a VM exists, the user then manually accesses the VM and its associated files in a separate VM display window, such as illustrated in FIG. 7A.

In contrast, and representative of several embodiments of the present invention, FIG. 7B illustrates host display window 122 of host OS visually presenting a composite file tree 170, which is the combination of host file tree 166 and guest file tree 168, to a user within host display window 122 as if guest file tree 168 is part of the native OS environment of host OS 104". Accordingly, an automated component (as describe in FIGS. 8 and 9) is provided such that the user is not even aware that a VM exists. In this way, a user may launch a legacy application file residing on a VM and the visual presentation of that application file is provided to the user in the native OS environment such that guest files, for example, guest files 1, 2, and 3, have the appearance of residing on the user's local drive. The automated component for providing composite file tree 170 is described in further detail in reference to FIGS. 8 and 9.

Figure 8:
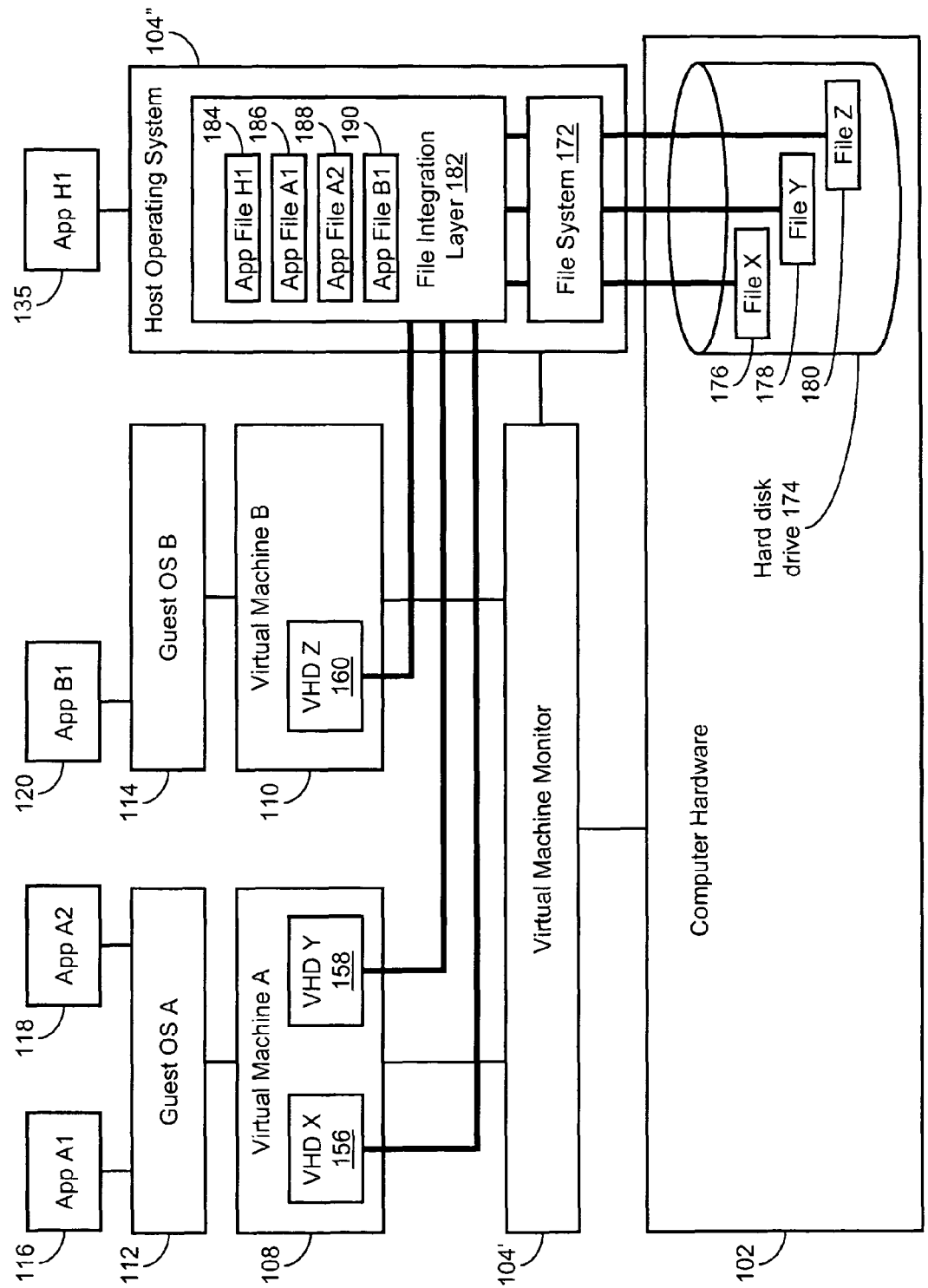
FIG. 8 is a block diagram that represents portions of the system of FIG. 3B in a second embodiment of the invention and further comprises a plurality of application files within an integrated file system.

In regard to certain alternative embodiments of the present invention, FIG. 8 illustrates portions of the system of FIG. 3B that further comprise a plurality of emulated devices, in this instance a plurality of virtual hard drives (VHDs). As known and understood by those skilled in the art, a VHD is a virtualized device, logically equivalent to a physical hard drive device, that a virtual machine emulates for a guest operating system. (As used herein, the terms "hard disk," "hard drive," and "hard disk drive" may be used interchangeably.) In FIG. 8, VM A 108 comprises VHD X 156 and VHD Y 158 which, for example, the virtual machine may emulate for guest OS A 112 as hard drive "C:" and hard drive "D:" (not shown). Likewise, VM B 110 comprises VHD Z 160 for guest OS B 114 as hard drive "C:" (not shown) for that operating system.

In this embodiment, VHD X 156 is implemented as a single data file, a file X 176, on a physical hard disk drive 174 of the computer hardware 102; VHD Y 158 is also implemented as a single data file, a file Y 178, on the same physical hard disk drive 174; and VHD Z 160 is also implemented as a single data file, a file Z 180, on the physical hard disk drive 174. Of course, as will be understood and readily appreciated by those skilled in the art, these VHD representations may be located in several files and across separate hard drives or separate computer systems, or they can be something other than a file (for example, a table in a database, a database, or a block of active memory). Moreover, although for the present embodiment all three VHDs are in fact files maintained by file system 172 of host OS 104", in alternative embodiments, they may be implemented in other ways, such as files or other data structures maintained by the VMM 104'. Nevertheless, in the present embodiment, and as illustrated in FIG. 8, VHD X 156, VHD Y 158, and VHD Z 160 are implemented through file system 172 of host OS 104" as file X 176, file Y 178, and file Z 180, respectively, on physical hard disk drive 174 of physical computer hardware 102.

In FIG. 8, host OS 104" further comprises a file integration layer 182 that is a software layer that operates somewhere above file system 172 and that further comprises a plurality of application files that provide a mechanism for interacting with any host or VM application seamlessly in the host environment. In this example, file integration layer 182 of host OS 104" comprises an application file H1 184 associated with application H1 135 of host OS 104", an application file A1 186 associated with application A1 116 of guest OS A 112, an application file A2 188 associated with application A2 118 of guest OS A 112, and an application file B1 190 associated with application B1 120 of guest OS B 114.

The system of FIG. 8 provides to the user a mechanism in the host environment for collectively viewing all files associated with VHDs 156, 158, and 160 and hard disk drive 174 of computer hardware 102 in a commingled fashion, regardless of whether the files associate with the host or a VM. For example, application file H1 184, application file A1 186, application file A2 188, and application file B1 190 are all visible to the user in the "My Computer" or "Explore" windows of host OS 104". In this way, the accessibility of host and VM application files within file integration layer 182 of host OS 104" eliminates the need for the user to open and navigate separate windows in the host environment that represents the desktop of each VM by which he/she interacts with any associated guest OS applications. When an application file is selected by the user the file integration layer 182 provides the mechanism for identifying whether the given application file is associated with a host or VM application. File integration layer 182 then communicates to either host OS 104" or VMM 104', respectively, to take the necessary action to interact with the user-selected application.

As a result, the user is provided a user-friendly, automated, seamless mechanism between, for example, host OS 104", VM A 108, and VM B 110, which thus provides the visual appearance of all guest OS application files that exist and execute in the host environment. Application A1 116, application A2 118, and application B1 120 may be either legacy or modern applications; thus, this embodiment of the present invention provides a method of visually integrating an application of a legacy OS (e.g., MS-DOS, Windows 3.X, Windows 95, Windows 98, Windows Me, Windows NT, and Windows 2000) within a host environment, such as Windows XP. Furthermore, this embodiment of the present invention allows the possibility of multiple applications on multiple OSes, respectively, to run simultaneously and with the appearance of running in the host environment.

The operation of the system of FIG. 8 is described in reference to FIG. 9, which is a flowchart that illustrates a method 200 of providing and using an application file in a host environment for accessing a guest file tree associated with a VM and visually displaying it in the native host environment. At step 202, the method first comprises the installation of an application file for each existing host and VM application. Consequently, the virtual machine's desktop is no longer visible. As a result, the VM application files appear alongside and interspersed with the host computer system's application files and all are visible and accessible to the user in the "My Computer" or "Explore" windows of the host environment of host OS 104". Furthermore, the individual VM application files appear alongside and interspersed with, potentially, application files from other VMs that are running simultaneously. At step 204, the user selects a host or VM application to interact with, by clicking on its associated application file. For example, to interact with application H1 135 of host OS 104" the user clicks on the application file H1 184. Similarly, to interact with application A1 116 of guest OS A 112 the user clicks on the application file A1 186.

At step 206, the selected application file communicates a request to interact with its associated application through file integration layer 182 of host OS 104", which subsequently determines (at step 208) whether the application is a host or VM application. At step 210, if at step 208 it is determined that the request is a VM application, file integration layer 182 communicates to VMM 104' to launch a VM with its associated guest OS, such as VM A 108 and guest OS A 112 or VM B 110 and guest OS B 114. At step 212, the guest OS launches the VM application, such as guest OS A 112 launching application A1 116 or guest OS B 114 launching application B1 120. The application subsequently executes and is presented visually to the user as though the application were running in the host environment, even though it is actually executing on a VM. At step 214, if at step 208 it is determined that the request is a host application, such as application file H1 184 requesting to interact with application H1 135, file integration layer 182 communicates to host OS 104" to interact with the host application.

The seamless software integration systems and methods described in FIGS. 4, 5, 6, and 7 that relate to VM A 108 and guest OS A 112 or VM B 110 and guest OS B 114 are exemplary and equally applicable to any other VM and guest OS. The seamless software integration systems and methods described in FIGS. 4, 5, 6, and 7 are not limited to a standalone computer system; they may also be generally applied to a virtual network system.

For certain additional embodiments, files in the VM environment are automatically loaded by an application in the host environment or alternatively files in the host environment are automatically loaded by an application in the VM environment. For example, the user clicks on a Word 97 document residing upon the local physical hard drive of the native host environment. The native OS, such as Word XP, is aware that a Word 97 document runs better in a Word 97 application running in Windows 95. Furthermore, the native OS is aware that there is a VM already executing that happens to have a Word 97 application loaded thereon. So rather than the native OS performing the default operation, where the Word 97 document is launched in the native host environment (Word XP), knowing from the metadata that the file is a Word 97 file, the native OS opens the file using the Word 97 application running on a VM, The Word 97 application will run more robustly in the legacy VM environment then in the native environment as there may be inconsistencies between Word 97 and Word XP.

The general steps of launching a legacy file, for example, a Word 97 document residing upon the local hard drive of the native OS running, for example, Windows XP is as follows:
1. The user selecting the Word 97 document in the native OS;
2. The host OS loading a Windows 95 VM;
3. The VMM loading a Word 97 application on the Windows 95 VM;
4. The VMM then gaining access to the host OS and files by reaching across to the host environment via internal networking;
5. The VM loading the content of the Word 97 document file into the VM environment; and
6. The VMM promoting the display of the Word 97 document back to native OS.

The general steps of launching a modern file, for example, a Word XP document residing upon the VHD of a VM running, for example, Windows 95 is as follows:
1. The user selecting the Word XP document on a VHD of a VM running a legacy OS, such as Windows 95;
2. The VMM kicking out of the VM and into the host environment;
3. The VMM then gaining access to the host OS applications by reaching across to the host environment via internal networking;
4. The host loading the content of the Word XP document file into the native host environment; and
5. The host promoting the display of the Word XP document file into the native OS.

In addition to the foregoing, various additional embodiments of the present invention are directed to similarly integrating components of a guest menu bar into the host menu bar, as well as portions of the guest OS start menu into the host OS start menu, and so on and so forth.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A computerized method, comprising:
   executing an instance of a first version of an operating system as a host operating system on a computing device;
   displaying on a display device associated with the computing device, in an execution environment of the host operating system, a proxy icon for an application preconfigured to optimally execute on a second version of an operating system;
   receiving, by the host operating system, a selection of the proxy icon;
   determining, in response to receiving the selection of the proxy icon, that the application is configured to execute on the second version of the operating system;
   sending a signal indicative of the selection of the proxy icon to a virtual machine monitor so that the virtual machine monitor causes, in response to receiving the selection of the proxy icon:
   execution on the computing device of a virtual machine, wherein the virtual machine includes virtualized hardware;
   execution of an instance of the second version of the operating system in the virtual machine as a guest operating system;
   execution of the application on the guest operating system executing in the virtual machine; and
   display of a user interface for the application executing on the guest operating system.

2. The method of claim 1, further comprising:
   executing an application launch layer; and
   receiving, by the application launch layer, a signal indicative of the selection of the proxy icon.

3. The method of claim 2, further comprising:
   receiving, by a virtual machine monitor, a signal from the application launch layer; and
   executing the virtual machine in response to the signal received from the application launch layer.

4. The method of claim 2, wherein the host operating system includes the application launch layer.

5. The method of claim 1, further comprising:
   setting a presentation style of the user interface for the application to a presentation style of a user interface for the host operating system.

6. The method of claim 1, wherein displaying the user interface for the application executing on the loaded guest operating system further comprises:
   displaying the user interface for the application executing on the loaded guest operating system within a user interface of the host operating system.

7. The method of claim 1, wherein displaying the user interface for the application executing on the loaded guest operating system further comprises:
   displaying the user interface for the application executing on the loaded guest operating system within a user interface of the loaded guest operating system.

8. The method of claim 1, wherein displaying the user interface for the application executing on the guest operating system further comprises:
   displaying the user interface for the application executing on the loaded guest operating system within a user interface of the loaded guest operating system and additionally displaying the user interface for the loaded guest operating system within a user interface of the host operating system.

9. A computer system for integrating a virtual machine with a host operating system comprising:
   a processor;
   a computer-readable storage medium in communication with said processor when the computer system is operational, the computer-readable storage medium comprising computer executable instructions, that upon execution by the processor cause:
   displaying, on a desktop of a host operating system, an icon for a file, wherein contents of the file are stored in a file system of the host operating system, wherein the host operating system is an instance of a first version of an operating system;
   receiving, by an application launch layer, a selection of the icon;
   selecting a legacy version of an application to open the file from a group of different versions of the application based on metadata in the file, the metadata identifying an association between the file and the legacy version of the application, wherein the legacy version of the application is preconfigured to optimally execute on a second version of an operating system;

sending a signal to a virtual machine monitor so that the virtual machine monitor causes, in response to receiving the selection of the icon:
starting an instance of the second version of the operating system as a guest operating system in a virtual machine in response to the receipt of the selection of the icon by the application launch layer;
an instance of the legacy version of the application on the guest operating system within the virtual machine;
opening the contents of the file in the legacy version of the application executing on the guest operating system; and
displaying a user interface for the legacy version of the application executing on the guest operating system.

10. The system of claim 9, wherein displaying the icon for the file further comprises:
displaying a proxy icon for the legacy version of the application on the desktop of the host operating system.

11. The system of claim 9, wherein the computer-readable storage medium further comprises executable instructions, that upon execution by the processor cause:
executing a virtual machine monitor;
receiving, by the virtual machine monitor, a signal from the application launch layer; and
executing the virtual machine in response to the signal received from the application launch layer.

12. The system of claim 10, wherein the host operating system includes the application launch layer.

13. The system of claim 10, wherein the computer-readable storage medium further comprises executable instructions, that upon execution by the processor cause:
setting a presentation style of the user interface for the legacy version of the application to use a presentation style of a user interface for the host operating system.

14. The system of claim 9, wherein displaying the user interface for the legacy version of the application further comprises:
displaying the user interface for the legacy version of the application within a user interface of the host operating system.

15. The system of claim 9, wherein displaying the user interface for the legacy version of the application further comprises:
displaying the user interface for the legacy version of the application within a user interface of the guest operating system.

16. A computer-readable storage device comprising computer-readable instructions for integrating a virtual machine with a host operating system, the computer-readable storage medium comprising executable instructions, that upon execution by the processor cause:
displaying, on a desktop of a host operating system, a proxy icon for a file, wherein metadata in the file associates the file with an application configured to open the file, wherein the host operating system is an instance of a first version of an operating system, wherein the application is optimized to run on a second version of an operating system;
receiving, by an application launch layer, a selection of the proxy icon;
determining, by the application launch layer, that the application is configured to open the file;
determining that the application is configured to execute on the second version of the operating system;
sending a signal to a virtual machine monitor so that the virtual machine monitor causes, in response to receiving the selection of the proxy icon:
executing an instance of the second version of the operating system as a guest operating system in a virtual machine in response to the receipt of the selection of the icon by the application launch layer;
executing the application on the guest operating system;
loading content of the file into the application executing on the guest operating system; and
displaying a user interface for the application executing on the guest operating system.

17. The computer-readable storage device of claim 16, further comprising executable instructions, that upon execution by the processor cause:
instantiating the virtual machine in response to receiving the selection of the proxy icon.

18. The computer-readable storage device of claim 16, wherein displaying the user interface for the application further comprises:
displaying the user interface for the application within a user interface of the host operating system.

19. The computer-readable storage device of claim 16, wherein displaying the user interface for the application further comprises:
displaying the user interface for the application within a user interface of the guest operating system.

20. The computer-readable storage medium of claim 16, wherein displaying the user interface for the application further comprises:
displaying the user interface for the application within the a user interface of the guest operating system and displaying the user interface for the guest operating system within a user interface of the host operating system.

* * * * *